United States Patent Office 2,781,352
Patented Feb. 12, 1957

2,781,352

PROCESS FOR PREVENTING CORROSION, CORROSION INHIBITORS AND CERTAIN COGENERIC MIXTURES CONTAINING CYCLIC AMIDINES

Melvin De Groote and Jen-Pu Cheng, University City, Mo., assignors to Petrolite Corporation, Wilmington, Del., a corporation of Delaware No Drawing. Application June 9, 1955,
Serial No. 514,396

27 Claims. (Cl. 260—309.6)

One aspect of the present invention relates to the inhibiting of corrosion of metals, and particularly to a composition for use in preventing corrosion of metals and particularly iron, steel, and ferrous alloys. The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. Our inhibitors may, however, be used in other systems or applications. They appear to possess properties which impart to metals resistance to attack by a variety of corrosive agents, such as brines, weak inorganic acids, organic acids $CO_2$, $H_2S$, etc.

A variety of materials, such as cyclic amidines or cyclic amidine derivatives, have been used for prevention of corrosion under conditions for which the use of the herein compounds are indicated. See, for example, U. S. Patent No. 23,227, reissued May 9, 1950, to Blair and Gross.

Emphasis is directed to the fact that the herein described compounds are particularly effective in an oil-brine mixture for some obscure reason, perhaps due to the greater solubility in brine compared with the usual cyclic amidine or cyclic amidine derivative.

A second aspect of the present invention is concerned with these compounds themselves for the reason that they have utility for purposes other than prevention of corrosion. Conventionally available cyclic amidines or cyclic amidine derivatives find utility in the preparation of sprays for use in agriculture such as fungicidal sprays and herbicidal oils. They find use in anti-static treatment in connection with polishes, lubricants for synthetic fibers, etc. They are useful in the resolution of petroleum emulsions and particularly for the oil-in-water type as well as the water-in-oil type. They are useful for water scale solvents, germicidal corrosion-inhibited acid detergents for dairies, etc. They have been used in flotation for the beneficiation of phosphate rock, potash, feldspar, barite, low grade iron and other metal ores. In the petroleum industry, in addition to their use in demulsification they have been used in the acidization of calcareous structures, and as anti-stripping agents in asphalt emulsions and cutbacks. They are useful as bentonite-amine complexes, metal-amine complexes, etc., for various purposes. They are useful as industrial bactericides, and especially in secondary flood operations for the recovery of oil in oil-bearing strata.

More specific reference to the use of these products outside the field of corrosion inhibition or prevention appears subsequently.

Briefly stated, the compositions employed in the present invention are obtained by reactions involving blow vegetable or animal oils, or their comparable derivatives; for instance, other esters of higher fatty acids and polyamines so as to yield compounds which have a complexity for obvious reasons beyond the cogeneric mixtures obtainable by the usual procedure of reacting polyamines with the fatty acid or fatty acid glyceride. For this reason the products themselves rather than particularly the cogeneric mixture are described in terms of the method of manufacture.

For convenience, what is said hereinafter is divided into seven parts:

Part 1 is concerned with suitable polyamines which may be employed in the manufacture of the herein described compounds;

Part 2 is concerned with the preparation of suitable blown oils for use in the present invention;

Part 3 is concerned with a brief discussion of the formation of cyclic amidines from a simple higher fatty acid i. e., the conventional cyclic amidines available in commerce or readily prepared by well known procedures;

Part 4 is concerned with the more complex nature of the cogeneric mixtures obtained by reaction of blown oils of the kind specified in Part 2 above, with polyamines as described in Part 1, to yield compounds which, for sake of better description, will be referred to as being analogous to the cyclic amidines noted in Part 3 above;

Part 5 is concerned with the preparation of products of the kind which comprise one aspect of the present invention;

Part 6 is concerned with the use of such materials for the prevention of corrosion and as corrosion inhibitors; and Part 7 is concerned with other uses for such products outside the field of corrosion inhibition.

PART 1

Examples of polyamine which may be suitably employed as reactants to produce the nitrogen-containing compounds of the present invention include the polyalkylene polyamines, such as ethylenediamine, diethylenetriamine, triethylenetetramine, tetraethylenepentamine, and higher polyethylene polyamines. They also include 1,2-diaminopropane, N-ethylethylenediamine, N,N-dibutyldiethylenetriamine, 1,2-diaminobutane, hydroxyethylethylenediamine, 1,3-propylenetriamine, and the like.

Equally suitable for use in preparing those compounds of our invention which are tetrahydropyrimidines substituted in the 2-position are the polyamines containing at least one primary amino group and at least one secondary amino group or a second primary amino group, separated from said first primary amino group by 3 carbon atoms.

Examples of amines suitable for this synthesis include 1,3-propylenediamine, 1,3-diaminobutane, 2,4-diaminopentane, N-aminoethyltrimethylenediamine, tripropylenetetramine, tetrapropylenepentamine, high-boiling polyamines prepared by the condensation of 1,3-propylene dichloride with ammonia, and similar polyamines in which there occurs at least one primary amino group separated from another primary or secondary amino group by 3 carbon atoms.

Other than the usually available ethylene polyamines and the derivatives thereof obtained by treating one mole of amine with one mole of an alkylene oxide, such as ethylene oxide, propylene oxide, butylene oxide, glycide, styrene oxide, etc., there are available commercial compounds such as 1,2-diaminopropane, 1,3-diaminobutane, and 3,3'-iminobispropylamine. Such compounds, of course, also can be reacted with a mole of the alkylene oxides previously noted.

Various polyamines of somewhat different structure can be obtained by reacting monoamines or polyamines with alkylene imine, such as ethylene imine, propylene imine, etc. The amines so obtained having in some instances two different radicals uniting various nitrogen atoms also can be treated with alkylene oxides as previously noted.

In essence, any one of a number of suitable polyamines are acceptable provided the structure contains a primary amino group and a secondary amino group separated by at least two and not more than three carbon atoms provided that side chains or some other functional group does not interfere with ring formation.

In the hereto appended claims reference to polyalkylene amines includes all such amines which are functionally capable of forming cyclic amidines as, for example, polyamides in which one or two terminal groups have been replaced by a hydroxyalkyl radical or by an alkyl radical or the like. Obviously in the case of a diamide only one terminal group can be so converted. In the case of amines having 3 or more nitrogen atoms, both terminal groups could be converted. This applies regardless of whether the products form 5-membered rings or 6-membered rings.

PART 2

As previously noted, Part 2 is concerned with the preparation of suitable blown oils. Actually, one could blow the ethyl or methyl ester or some other ester of a suitable fatty acid, for instance a glycol ester or the ester of an alcohol having more than three hydroxyls, such as the comparable ester derived from diglycerol, pentaerythritol, sorbitol, or the like.

For practical purposes there is nothing to be gained by using a more expensive or peculiarly derived raw material. Any ordinary fatty acids of commerce derived from either vegetable or mineral fats are satisfactory and reference is made particularly to those which are unsatisfactory as described in the voluminous literature, particularly patent literature dealing with blown oils.

A comparatively brief description of blown fatty oils appears in U. S. Patent No. 2,622,070, dated December 16, 1952, to Monson. The description therein is incorporated herewith.

Blown fatty oils, and particularly blown castor oil, have long been known and have been used in various arts, including the demulsification of petroleum oils. In general, they are produced by the action on a fatty oil or fatty acid of an oxygen-containing gas, commonly air, and usually at somewhat elevated temperatures. In characteristics, they range from relatively low viscosity, light colored liquids to nearly black liquids whose consistency may best be defined as semi-livery. We prefer to use blown castor oil as the preferred ingredient of this type of our reagent.

It has long been known that various animal, vegetable, and marine oils can be blown or oxidized, so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C. or 130° C., or may be conducted at a much higher temperature. Oxidation may be conducted in absence of catalysts, or in presence of catalysts. Such catalysts may consist of metallic salts, such as cobalt or manganese oleate, or may consist of organic material, such as alpha pinene or the like. Oxidation may be conducted in a relatively short time, such as 20 hours, or may require 200 hours or more.

Patents which describe conventional blown oils or conventional methods of making various blown oils for various purposes (including in some instances, for the purpose of demulsifying crude oils), include the following:

U. S. Patent No. 1,929,399, dated October 3, 1933, to Fuchs; U. S. Patent No. 1,969,387, dated August 7, 1934, to Tumbler; U. S. Patent No. 2,023,979, dated December 10, 1935, to Stehr; U. S. Patent No. 2,041,729, dated May 26, 1936, to Seymour; and U. S. Patent No. 1,984,633, dated December 18, 1934, to De Groote and Keiser.

Insofar that the material or composition we prefer to use as a component of the reagent of our process is derived from blown castor oil, an effort will be made to describe said material or compound in considerable detail. Mild oxidation of castor oil (see "Chemical Technology and Analysis of Oils, Fats and Waxes," by Lewkowitsch, 6th edition, vol. 2, p. 406) produces relatively small modifications in certain important chemical indices, such as the iodine value, the acetyl value, and the saponification value. If drastic oxidation takes place, either by continued mild oxidation from the very beginning of the reaction, or as induced by either a higher temperature of reaction, or by the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; a specific gravity of almost 1, or even a trifle over 1 at times; and in absence of other coloring matter, a deep orange to deep brown color.

Drastically oxidized castor oil can be prepared by well known methods, or such products can be purchased on the open market under various trade names, such as "blown castor oil," "bodied castor oil," "blended castor oil," "blended bodied castor oil," "processed castor oil," "oxidized castor oil," "heavy castor oil," "viscous castor oil," etc. These various names appear to be applied to drastically oxidized castor oils which are different in degree but not different in kind.

In preparing the reagent employed in our process, not only may blown oils be derived by direct oxidation of the various fats and oils, but also by direct oxidation of the fatty acids. Blown ricinoleic acid may be derived in the manner indicated in U. S. Patent No. 2,034,941 dated March 24, 1936, to De Groote, Keiser and Wirtel. It should be noted that blown oils in the broad generic sense herein employed include not only the products derived by oxidation, but also the products derived by polymerization. Reference is made to polymerized ricinoleic acid described in U. S. Patent No. 1,901,163, dated March 1, 1933, to Hinrichs. Reference is also made to polymerized castor oil or similar oils of the kind disclosed in copending application Serial No. 59,090, filed January 13, 1936, by Ivor M. Colbeth, now U. S. Patent No. 2,114,651. It might also be desirable to point out that the expression "blown oil," as herein used, contemplates blown unsaturated liquid waxes, such as blown sperm oil. It is understood that in the appended claims the expression "blown fatty oil" is used in its broad sense to include all the various materials, such as esterified blown fatty acids.

Fatty acids susceptible to blowing or oxidation are most economically employed as the naturally occurring esters, i. e., the glycerides. However, some other suitable ester prepared from a monohydric alcohol, a glycol, trimethylolethane, and trimethylolpropane may be employed. If desired, a fatty acid may be blown or polymerized and then converted into an ester. For instance, the methyl, ethyl, propyl, glyceryl, or any other suitable ester may be prepared from blown castor oil fatty acids, by conventional esterification processes; and the ester so produced may then be reacted with the amino compound to yield the cogeneric mixture of our invention.

A drastically oxidized castor oil of the above kind may, for example, have approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |

| | |
|---|---|
| Hydroxyl number | 188.0 to 220.0 |
| Percent unsaponifiable matter | 1.1 |
| Percent nitrogen | 0.0 |
| Percent SO$_3$ | 0.0 |
| Percent ash | Trace |

Another variety of drastically oxidized castor oil which we prefer to use shows the following characteristics:

| | |
|---|---|
| Acid number | 6.3 to 8.7 |
| Saponification number | 202.5 to 223.0 |
| Iodine number | 60.8 to 63.0 |
| Acetyl number | 105.3 to 108.4 |
| Hydroxyl number | 114.4 to 118.0 |
| Percent unsaponifiable matter | 1.0 to 1.2 |
| Percent nitrogen | 0.0 |
| Percent SO$_3$ | 0.0 |
| Percent ash | 0.0 |

It is our preference to use blown oils, rather than blown fatty acids. We particularly prefer to use blown vegetable oils such as blown cottonseed oil, blown corn oil, blown soyabean oil, blown rapeseed oil, and especeially blown castor oil. Our preferred blown oil is a blown castor oil, which has been blown somewhat more drastically than indicated by the indices above recited, and which has been blown just short of the stage which produces semi-livery oils, as described in the aforementioned Stehr Patent No. 2,023,979.

Another blown oil which we have found useful in preparing our reagents is produced from a mixture of 85 parts of castor oil and 15 parts of soyabean oil. This mixture is heated at about 250° C. and is blown with air until a high viscosity is attained. For example, the viscosity of such finished blown product may be as high as 50,000 or 75,000 centipoises; and in some instances we have employed blown oils of this composition having viscosities in excess of 100,000 centipoises at room temperature, to produce our reagents.

The complex nature of the products obtained by oxidation (blowing) and the simultaneous or subsequent polymerization, and rearrangement, have been discussed in the chemical literature as distinguished from the operative steps described in most of the patent literature. See what is said elsewhere regarding commercially available blown catsor oils. As to facts concerned with such oxidation and polymerization which make the blown fatty oils or blown and polymerized fatty oils of the kind herein described entirely a different reactant than the fatty acids or fatty oils themselves. See Chemical Abstracts, volume 46 (1952), page 9858, wherein it states:

"A review of the theories of Fahrion (cf. Chem. Ztg. 28, 1196 (1906)), Elm (cf. C. A. 25, 5303), Staudinger (cf. C. A. 19, 2658), Slansky (cf. C. A. 16, 652, 3765), and Kappelmeier (cf. C. A. 33, 1969), on peroxide formation and polymerization in the drying of oils and polymerization in heating in the absence of air. Various processes for prepg. oxidation oils, of which the blowing of air through the heated oil is one, are reviewed, as well as industrial uses of blown oils. The analytical methods used in this study are described. To blow oils, 600 g. of oil was placed in a current of 61./min. of dry air at various temps. and times. Mol. wts. were detd. by cryoscopy in benzene or PhNO$_2$. Virgin oils contg. OH groups (castor oil, wrightia) show a pos. slope in the mol. wt.-concn. graph, others (linseed, peanut) show a neg. slope. For blown oils the slope for linseed and peanut oil gradually changes with time of blowing (faster at a higher temp.) until the sign changes. This indicates the production of OH groups. I no. and SCN no. of blown oils depend on time of contact with reagent, excess reagent present, kind of reagent (Hanus, wijs, or Rosemund for I no.), and SCN concn. in reagent. However, standard conditions were chosen and useful nos. obtained. Diene no. was detd. by treating with maleic anhydride to indicate the extent of conjugation. There was no interference by OH. Linseed oil showed a decrease in diene no. during blowing, showing no rearrangement of isolated to conjugated double bonds was occurring. Br-fixation no. was detd. by a modified method of Meinel (cf. C. A. 28, 6119). Again blown oils (linseed, soybean, castor, tung) showed less conjugation than virgin oils while during heating in absence of air the opposite occurs. In studies on peanut, soybean, colza, linseed, and tung, oxidation was nonselective, i. e. unlike in hydrogenation, the double bonds in multiple unsatd. acids were attacked at random. This is shown by the fact that the I nos. and SCN nos. run parallel. In all cases the peroxide content showed a max. at a certain time, probably because polymerization through peroxide intermediates became rapid as shown by the rapid rise in viscosity. The viscosity of peanut oil was studied with respect to its possible use as a lubricant. For a given viscosity a higher blowing temp. gives a lower acidity. Blowing at 150–200 is recommended. Industrial products blown with O, compounding with mineral oils and the increase in viscosity with time after blowing were also studied. A method for distinguishing colza oil (or crucifer oils in general) from others is described, valid for blown as well as virgin oils. This consists in sepg. the oxidized acids with petr. ether then sepg. the nonoxidized acids into 'solid' and 'liquid' with pb-(OAc)2; if the solid acid has high I no., it is erucic acid, and the oil is a crucifer oil. For all oils, there was still unsatn. when gelationization occurred, so that the oxidation is never complete."

Subsequently there is a description of blown castor oils which are representative of those available in the open market. The manufacturer in describing these products states as follows: The modifying process, i. e., blowing or oxidation, along with at least a significant amount of polymerization, is a very complicated procedure involving the use of catalysts. The following five reactions are most important:

1. Dehydroxylation
2. Dehydrogenation
3. Rearrangement
4. Polymerization
5. Oxidation Actually, what applies to castor oil applies also to unsaturated oils such as soyabean oil because of the fact that a hydroxylated compound is probably formed and dehydroxylation follows.

One can purchase blown soyabean oil in the open market. We have used products which are offered in the open market and in which the specifications are as follows:

*Example 1a*

| | Max. | Min. |
|---|---|---|
| Specific Gravity at 60°/60° F | .940 | .938 |
| Acid number | 5.0 | 2.5 |
| Iodine number (Wijs) | | 120.0 |
| Saponification number | | 192.0 |
| Unsaponifiable matter_____percent | 1.5 | |
| Color (Gardner at 20°–30° C.) | 4–5 | |
| Viscosity (Gardner-Holdt at 25° C.) | | D–E |

*Example 2a*

| | Max. | Min. |
|---|---|---|
| Specific gravity at 60°/60° F | .989 | .986 |
| Acid number | 10.0 | 7.0 |
| Iodine number | | 64.0 |
| Saponification number | 215.0 | 205.0 |
| Solubility | 6.0 | 4.0 |
| Color (Gardner at 20°–30° C.) | 8 | |
| Viscosity (Gardner-Holdt at 25° C.) | | Z–4 |

Example 3a

|  | Max. | Typical | Min. |
|---|---|---|---|
| Specific gravity at 60°/60° F | .989 | .987 | .986 |
| Acid number | 10.0 | 8.0 | 7.0 |
| Iodine number (Wijs) | 85.0 | 75.0 | 64.0 |
| Saponification number | 215.0 | 210.0 | 205.0 |
| Solubility for oleum spirits | 6.5 | 5.5 | 5.0 |
| Color (Gardner at 20°–30° C.) | 8 | 7 | 6 |
| Viscosity Gardner-Holdt at 25° C. | Z–5 | Z–4 | Z–3 |

Example 4a

|  | Max. | Min. |
|---|---|---|
| Specific gravity at 60°/60° F | .990 | .987 |
| Acid number | 11.0 | 8.0 |
| Iodine number (Wijs) | 75.0 | 65.0 |
| Saponification number | 220.0 | 210.0 |
| Solubility | 4.5 | 3.75 |
| Color (Gardner at 20°–30° C.) | 8 |  |
| Viscosity (Gardner-Holdt at 25° C.) |  | Z–6+ |

Example 5a

|  | Max. | Min. |
|---|---|---|
| Specific gravity at 60°/60° F | .980 | .975 |
| Acid number | 9.0 | 6.0 |
| Iodine number (Wijs) | 95.0 | 90.0 |
| Saponification number | 215.0 | 205.0 |
| Solubility (mineral spirits tolerance) |  | 20.0 |
| Color (Gardner at 20°–30° C.) | 8 |  |
| Viscosity (Gardner-Holdt at 25° C.) |  | Z–1+ |

Similarly, we have used blown castor oils which, as previously noted, in essence are at least in part blown dehydrated castor oils and such products are available in the open market and the products appearing in Table I are those commercially available.

TABLE I.—OXIDIZED AND POLYMERIZED GLYCERIDES OF RICINOLEIC ACID (BLOWN CASTOR OIL)

| Ex. No. | Specific Gravity, 25/25° C. | Viscosity (poises), 25° C. | Acid number |
|---|---|---|---|
| 1b | .968 | 11 | 4.2 |
| 2b | 1.000 | 28 | 17.0 |
| 3b | 1.020 | 110 | 21.0 |
| 4b | 1.031 | 170 | 24.0 |
| 5b | 1.031 | 170 | 26.0 |
| 6b | .966 | 13 | 4.0 |
| 7b | .995 | 23 | 11.5 |
| 8b | .993 | 32 | 9.0 |
| 9b | .994 | 48 | 5.2 |
| 10b | 1.011 | 170 | 14.5 |
| 11b | 1.021 | 500 | 15.0 |
| 12b | 1.022 | 740 | 15.0 |

Sometimes it is desirable to partially dehydrate castor oil and then subject it to oxidation which may or may not involve polymerization. Thus, we have found that blown dehydrated castor oil is just as satisfactory as a comparable blown linseed oil.

PART 3

Cyclic amidines can be prepared from monocarboxy acids, dicarboxy acids, or their esters. Similarly, some other obvious equivalents could be used such as the amide. This is perfectly obvious because, ignoring the first step of salt formation, when the acid is used a second step is amidification. The third step is ring formation. An effort to prepare blown fatty acids does not yield the same products as blown fatty oils primarily for the reason that oxidation (blowing) forms hydroxylated compounds or the equivalent and such hydroxylated compounds, or the functional equivalents such as anhydrides, combine with the fatty acid radicals to give a different structure than under circumstances where the fatty acid is combined in ester form. For all practical purposes one would not use any synthetically prepared ester but would use a naturally occurring ester which is usually a glyceride.

The reaction between a glyceride and a polyamine is somewhat different than an acid in certain respects. In the first place salt formation does not take place. If a fatty acid is added to an amine the first step is salt formation. Such step presumably does not appear when a glyceride is used and amidification results in the formation of glycerol or the equivalent alcohol. During subsequent reaction (ring formation) it is possible that the glycerol was decomposed into an aldehyde and the aldehyde in turn may or may not react with one or more reactants having a primary or secondary amine group. However, for purpose of simplicity one must consider the reaction as if it were taking place from a conventional fatty acid or glyceride rather than a blown product as far as present Part 3 is concerned.

The reaction between higher fatty acids or their equivalents with suitable polyamines yield cyclic amidines which include tetrahydro pyrimidines and imidazolines. Typical imidazolines are illustrated by the following:

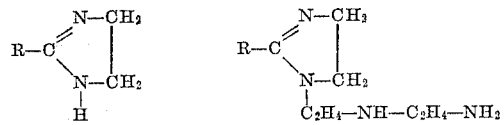

Typical tetrahydro pyrimidines are the following:

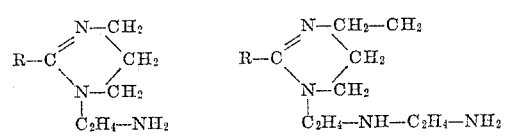

Similarly, cyclic amidines may be derived from a single polyalkylene amine and two molecules capable of furnishing the group R. This is illustrated by the following formula:

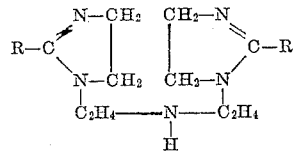

Cyclic amidines also may contain a basic tertiary amino group as illustrated by the following:

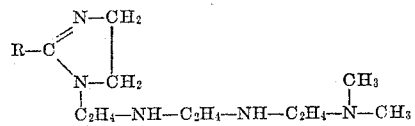

The preparation of imidazolines substituted in the 2-position (the position occupied by R in the above structural formulas) by aliphatic hydrocarbon radicals is described in the literature. It is readily carried out by reacting a monocarboxylic aliphatic acid or its ester or amide with a polyamine, said amine containing at least one primary amino group plus at least one secondary amino group or a second primary amino group, separated from said first primary amino group by 2 carbon atoms.

For details of preparation of imidazolines substituted in the 2-position and made from amines of this type see the following U. S. patents: U. S. Patent No. 1,999,989, dated April 30, 1935, to Bockmuhl et al.; U. S. Patents Nos. 2,155,877 and –8, dated April 25, 1939, to Waldmann et al.

This reaction is generally carried out by heating the reactants at a temperature of 230° C. or higher, usually within the range of 250–300° C., at which temperatures water is evolved and ring closure is effected. For details of the preparation of tetrahydropyrimidines, see German Patent No. 700,371, dated December 18, 1940, to Waldmann et al.; German Patent No. 701,322, dated January 14, 1941, to Miescher et al.; and U. S. Patent No. 2,194,419, dated March 19, 1940, to Chwala.

Reference is made also to aforementioned U. S. Patent No. Re. 23,227, to Blair et al., reissued May 9, 1950; and U. S. Patent No. 2,589,198, to Monson, dated April 11, 1952, for other examples of cyclic amidine materials of the present class. For certain of the 6-membered ring compounds, herein termed tetrahydropyrimidine compounds, see U. S. Patent No. 2,534,826, to Mitchell et al., dated December 19, 1950.

Over and above what appears in the patent literature, reference is made to "Imidazole and Its Derivatives, Part I" Hofmann, Interscience Publishers, Inc., New York, 1953. See also Chemical Reviews, volume 54, pages 593–613 (1954).

The manufacture of cyclic amidines depends essentially on the use of a temperature above the point of amidification and below the point of pyrolysis. The temperature involved in ring formation, of course, depends in part whether or not vacuum is employed to remove volatile material or perhaps whether or not a dried inert gas, such as nitrogen, is passed through during the reaction period. There is also a variation depending on whether or not one is attempting to make an amino imidazoline, an amido imidazoline, a diamido imidazoline, or the like. What is said in regard to the 5-membered ring compounds applies also the 6-membered ring compounds although such derivatives are of lesser importance for reasons of economy, as previously noted.

PART 4

In light of what has been said about blown oils and as has been pointed out, blown oils are almost partially and to a substantial degree polymerized. Polymerization is obvious in light of the significant increase in viscosity and thus means there have been formed peculiar polymerized acids having perhaps several carboxyl groups. It is also possible that there is degradation of the fatty acid in the sense that the fatty acid chain is broken and re-oxidized so as to give new and different carboxy acids not usually present in non-drying oils, semi-drying oils, drying oils, oils obtained by the partial or complete dehydration of castor oil, or the like. In light of such complex change in the fatty oil during blowing and at least partial polymerization, it is obvious the complex cogeneric mixture obtained by reacting such oils with polyamines represents end products of much greater complexity in nature and different from those obtained from unblown oils.

Bearing in mind when one reacts a fatty acid, such as oleic acid or stearic acid or the glyceride thereof, such as olein and stearin, with polyamines of the kind herein described, i. e., diethylene triamine, triethylene tetramine, and tetraethylene pentamine, etc., one can obtain the whole series of compounds in which the modification of the original final fatty acid molecule or a dimerized fatty acid of some kind, or a carboxy acid derived by breaking the fatty acid chain, or a number of other variants, can combine to form such things as amidines, di-amidines, amino amidines, amido amidines, to say nothing of polymeric compounds in which the dicarboxy acids form even more complex derivatives, either alone or in combination with those derived from monocarboxy acids. If the polyamine employed has been subjected to terminal oxyalkylation with a low molal alkylene oxide as previously described then of course one can obtain other variants in the cyclic amidine group as, for example, an ester of the substituted cyclic amidine. All this is stated again to emphasize the reason that the herein described compounds are characterized by reference to the method of manufacture.

PART 5

This part is concerned with the preparation of the cogeneric mixtures characterized by the presence of a substantial or major part of cyclic amidines or cyclic amidine derivatives. The method of preparation is substantially the same as the preparation of the comparable compounds from non-blown oils. This means one follows essentially the same procedure as if one were reacting castor oil, soyabean oil, cottonseed oil, linseed oil, or the like with the polyalkylene amine previously described.

The procedure is essentially one of heating at a temperature above the amidification temperature and below the point of pyrolysis. In other words, assuming amides are formed first the temperature must be conducted high enough to obtain ring formation.

In the instant case, however, due to the complexity of blown oils as compared with non-blown oils, one may obtain cross linking so the ultimate product, either as such or in the form of a salt, is solvent insoluble. This means that either the product as such or its salts are not soluble in water or alcohol or a mixture, and likewise are not soluble in hydrocarbon salts such as various aromatic solvents including high boiling aromatic solvents obtained in petroleum manufacture. Needless to say, a product which is not solvent-soluble either as such or in the form of a salt is unsatisfactory and not part of the present invention.

The procedure employed is illustrated by Example 1c, following:

Example 1c

A mixture of 292 grams of blown soyabean oil and 146 grams of triethylene tetramine was placed in a half-liter three-necked resin flask equipped with a mechanical stirrer, a thermometer, a nitrogen inlet, a water condenser, and a distillation receiver of the Stark and Dean type. The mixture in the flask was stirred and gradually heated to 110–115° C., and maintained there for an hour. At no time was the temperature allowed to rise above 125° C. at this early stage of reaction or a cross-linked rubber-like polymer might be formed. After maintaining the reaction mixture at 105–110° C. for an hour, it was then heated to 150–160° C. at which point water began to distill. Throughout the distillation a slow stream of nitrogen was introduced into the flask to help eliminate the water. Over a period of an hour and a half the temperature was raised to 198° C. and during this time 18.1 grams of water, together with a trace amount of triethylene tetramine was removed. After the removal of the water the reaction mixture was heated gradually to 315° C. over a period of an hour and another 18.3 grams of aqueous distillate was removed. The fluid reaction mixture was then cooled into an amber viscous mass. It was miscible with alcohol, soluble but not miscible with xylene or water. An analysis showed it contained 13.79% nitrogen.

In Table II following, there is summarized in tabular form a variety of other cogeneric mixtures obtained in the same manner as outlined in Example 1c, preceding.

TABLE II

| Ex. No. | Blown oil used, Ex. No. | Amt. (grs.) | Polyamine used | Amt. (grs.) | Time of reaction (hrs.) | Maximum temp. of reaction | Remarks |
|---|---|---|---|---|---|---|---|
| 1c | 1a | 292 | Triethylene tetramine | 146 | 3½ | 315 | Amber viscous mass. |
| 2c | 1a | 292 | Tetraethylene pentamine | 189 | 3½ | 310 | Dark amber thick mass. |
| 3c | 1a | 292 | Hydroxyethyl ethylene diamine | 105 | 4 | 310 | Dark brown almost hard solid. |
| 4c | 1a | 292 | Mathieson amine 333 | 146 | 3 | 302 | Amber thick liquid. |
| 5c | 1a | 292 | Diamino propane | 74 | 3 | 312 | Brown viscous liquid. |
| 6c | 4a | 254 | Diethylene triamine | 103 | 3½ | 305 | Amber thick mass. |
| 7c | 4a | 254 | Triethylene tetramine | 146 | 3½ | 308 | Do. |
| 8c | 4a | 254 | Hydroxyethyl ethylene diamine | 105 | 4¼ | 312 | Dark amber thick liquid. |
| 9c | 4a | 254 | 3,3-iminobispropylamine | 131 | 3½ | 281 | Dark amber viscous mass. |
| 10c | 1b | 224 | Ethylene diamine | 71 | 3½ | 296 | Amber thick liquid. |
| 11c | 1b | 224 | Diethylene triamine | 103 | 3½ | 303 | Brown almost hard solid. |
| 12c | 1b | 224 | Tetraethylene pentamine | 189 | 3½ | 310 | Dark brown viscous mass. |
| 13c | 1b | 224 | Hydroxyethyl ethylene diamine | 105 | 3¾ | 305 | Amber dark viscous liquid. |
| 14c | 1b | 224 | Mathieson amine 333 | 146 | 3½ | 307 | Amber thick liquid. |
| 15c | 4b | 242 | Triethylene tetramine | 146 | 3½ | 302 | Blackish thick liquid. |
| 16c | 4b | 242 | Tetraethylene pentamine | 189 | 3¾ | 298 | Dark brown mass. |
| 17c | 4b | 242 | Hydroxyethyl ethylene diamine | 105 | 3½ | 294 | Dark amber viscous liquid. |
| 18c | 4b | 242 | Diaminopropane | 74 | 3¼ | 315 | Amber thick mass. |
| 19c | 5b | 204 | Diethylene triamine | 103 | 3½ | 297 | Dark brown almost solid. |
| 20c | 5b | 204 | Triethylene tetramine | 146 | 3¾ | 289 | Dark amber almost solid. |
| 21c | 5b | 204 | Tetraethylene pentamine | 189 | 3½ | 294 | Amber blackish mass. |
| 22c | 5b | 204 | Hydroxyethyl ethylene diamine | 105 | 4¼ | 315 | Dark brown viscous liquid. |
| 23c | 5b | 204 | Iminobispropylamine | 131 | 3¾ | 280 | Dark brown thick liquid. |
| 24c | 11b | 259 | Ethylene diamine | 71 | 3½ | 320 | Amber thick mass. |
| 25c | 11b | 259 | Tetraethylene pentamine | 189 | 3¾ | 302 | Dark amber almost solid. |
| 26c | 11b | 259 | Hydroxyethylene ethylene diamine | 105 | 4 | 309 | Dark brown viscous liquid. |
| 27c | 11b | 259 | Mathieson amine 333 | 146 | 3¼ | 289 | Amber thick mass. |
| 28c | 11b | 259 | Diaminopropane | 74 | 3¾ | 220 | Dark amber viscous liquid. |

Having obtained a cogeneric mixture of the kind previously described, as has been noted before, they must be solvent-soluble, or in an oxygenated solvent, or a mixture of the same. This applies to the product as such or the salt form as, for example, after total or partial neutralization with acetic acid, glycolic acid, lactic acid, gluconic acid, or the like. Thus, such products and the salts may be dissolved in benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. One may use solvents having a common solvent effect, such as the methyl, ethyl, propyl, and butyl ethers of various glycols, diglycols and triglycols, such as the ethers corresponding to ethyleneglycol, diethyleneglycol, triethyleneglycol, propyleneglycol, dipropyleneglycol, tripropyleneglycol, butyleneglycol, dibutyleneglycol, tributyleneglycol, etc. Moreover, as previously pointed out one can use mixtures of one or more of these solvents but in any event the product as such, or in the salt form as noted, must be organic and solvent-soluble.

In Table III following, there are examples where products of the kind described in Table II, previously noted, have been neutralized, at least in part, with an acid and in some instances diluted with the solvent so as to give a solution containing 10% to 50% of the initial mixture or initial salt. For convenience, these are summarized in Table III following.

PART 6

As to the method for using the herein described products for prevention of corrosion and particularly for preventing the corrosion of ferrous metals and more specifically in connection with the oil industry, reference is made to aforementioned U. S. Patent No. Re. 23,227. See the subject matter beginning with line 49, column 8, and extending through line 69 in column 10. The same procedure has been employed herewith.

Note also that what is said in regard to the use of the materials as salts, whether organic or inorganic, applies with equal force and effect in the present instance and reference is made to the following two paragraphs which appear in column 8 of aforementioned Patent 23,227, and apply with equal force and effect to the herein described compounds.

"Although we have described the corrosion inhibitors of our process as imidazolines, we may in many instances, employ these compounds in the form of their salts, either with organic or inorganic acids. Being relatively strong bases, the imidazolines readily form such salts, and where the reagent contains basic groups in addition to the imidazoline ring nitrogen atoms, they may form di- or polysalts. Examples of acids which may be used to form such salts are hydrochloric acid, sulfuric acid, acetic acid, oxalic acid, maleic acid, oleic acid, abietic acid, phosphoric acid, petroleum sulphonic acid, naphthenic acid, rosin, phenylacetic acid, benzoic acid, and the like.

"Salts of the imidazolines, such as those above described, appear to be equally as effective as the free bases. Probably, in the dilute solutions in which they are employed as corrosion inhibitors, the salts hydrolyze or

TABLE III

| Ex. No. | Cogeneric cyclic amidine mixture, Ex. No. | Amount (grs.) | Acid used | Amt. (grs.) | If solution was prepared, solvent was— |
|---|---|---|---|---|---|
| 1d | 1c | 100 | Acetic acid | 45 | Isopropyl alcohol. |
| 2d | 5c | 100 | ----do---- | 18 | Do. |
| 3d | 6c | 100 | Propionic acid | 46 | Do. |
| 4d | 9c | 100 | ----do---- | 21 | Do. |
| 5d | 10c | 100 | Hydroxyacetic acid 70% | 42 | Do. |
| 6d | 12c | 100 | ----do---- | 105 | Do. |
| 7d | 15c | 100 | Lactic acid | 70 | Do. |
| 8d | 18c | 100 | ----do---- | 24 | Do. |
| 9d | 21c | 100 | Diglycolic acid | 75 | Do. |
| 10d | 27c | 100 | ----do---- | 55 | Do. | otherwise decompose to some extent and reach an equilibrium with the acids and other constituents of the corrosion medium."

Particularly suitable acids are low molal hydroxylated acids having not over six carbon atoms such as hydroxyacetic acid, lactic acid, gluconic acid, etc.

In the hereto appended claims reference to the cogeneric reaction products and the like is intended to include not only the products as such but also their salts derived from acids of the kind noted above. The basic materials may be partially or completely neutralized. Dicarboxy acids, and polycarboxy acids, such as diglycol acid, malonic acid, succinic acid, and the like may be employed.

PART 7

The products herein described have utility not only as such but also as initial reactants for further reaction. They may be combined with a variety of reactants as chemical intermediates, for instance, with various diepoxides or polyepoxides. They may be combined with a number of other monoepoxides such as epichlorohydrin, styrene oxide, glycide and methylglycide. They may be reacted with alkyl glycidyl ether, glycidyl isopropylether, and glycidyl phenyl ether.

Furthermore, such products may be reacted with alkylene imines such as ethylene imine or propylene imine, to produce cation-active materials. Instead of an imine, one may employ what is a somewhat equivalent material, to wit, a dialkylaminoepoxypropane of the structure

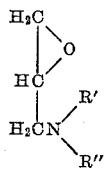

wherein R' and R" are alkyl groups.

The products may be combined with carboxy acids such as higher fatty acids, so as to change their characteristics or with polycarboxy acids, such as diglycolic, maleic acid, phthalic acid, succinic acid, and the like, to give resins, soft polymers or fractional esters which are essentially monomeric. Such products and others herein described may all be used for the resolution of petroleum emulsions of the water-in-oil type. The products without further reaction are particularly valuable as additives for lubricating oils which are derived from sources other than petroleum.

Attention is directed to the fact that the compounds herein described may or may not have definite effective emulsifying properties. A quick test will reveal that a number of them produce emulsions by solution in xylene followed by shaking with water as previously described. Over and above this, one sub-specie of the emulsifying species, are those which dissolve in xylene and produce an emulsion but are additionally characterized by the fact that they do not dissolve in water but hydrate in water to give a water-insoluble precipitate generally having the appearance of a floc or flocculent curd or curd which obviously is hydrated and usually highly hydrated. This particular specie or sub-specie, not only has utility for the purposes mentioned in regard to the class of materials as a whole but also has additional uses. Particular reference is made to five such uses for such more narrow class.

In the first place the material is valuable as a fuel oil additive in the manner described in U. S. Patent No. 2,553,183, dated May 15, 1951, to Caron et al. It can be used in substantially the same proportions or lower proportions and this is particularly true when used in conjunction with a glyoxalidine or amido glyoxalidine.

An analogous use in which these products are equally satisfactory, is that described in U. S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U. S. Patents No. 2,550,981 and 2,550,982, both dated May 1, 1951, and both to Eberz. Here again it can be used in the same proportions as herein indicated or even small proportions.

A third use is to replace oil soluble petroleum sulfonates so-called mahogany soaps, in the preparation of certain emulsions, or soluble oils or emulsifiable lubricants where such mahogany soaps are employed. The cogeneric mixtures having this peculiar property serve to replace all or a substantial part of the mahogany soap.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. & Proc., vol. 16, 1949, pp. 47–75. As stated, in the summary of this article, it states "The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Thus, these peculiar products giving curd precipitates with water, are unusually effective as coupling agents in many instances.

Fifth, these materials have particular utility in increasing the yield of an oil well by various procedures which in essence involve the use of fracturing of the strata by means of liquid pressure. A mixture of these products with oil or oil in combination with a gel former alone or a gel former and finely divided mineral particles, yields a product which, when it reaches crevices in the strata which are yielding water, form a gelatinous mass of curdy precipitate or solid or semi-solid emulsion of a high viscosity. In any event, it represents a rapid sealing agent for the strata crevices and permits pressure to be applied to fracture the strata without loss of fluid through crevices, openings or the like.

The addition of the oxyalkylene chain, and particularly the oxypropylene chain, to polyols produces effects at times impossible to predict and even difficult to evaluate after being recognized. For instance, the reaction of monooxyethylated aminopropyl diethyleneglycol with propylene oxide to yield a hydroxylated material which can be reacted with polycarboxy acids, particularly dicarboxy acids, to give fractional esters or polymers is well known. Such products are excellent demulsifying agents. Certain polyols particularly having 3 or more hydroxyls, as for example glucose, when reacted with 33 to 50 parts by weight of propylene oxide yield derivatives which without any further reaction of any kind are effective demulsifying agents. Such derivatives are also effective for other purposes, such as an anti-fogging agent in motor fuels, a coagulation preventive in burner oils, and as an additive for the prevention of corrosion of ferrous metals. Such invention, however, is not part of what is herein claimed.

The herein described products and the derivatives thereof are particularly valuable in flooding processes for recovery of oil from subterranean oil-bearing strata when employed in the manner described in U. S. Patent No. 2,233,381, dated February 25, 1941, to DeGroote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U. S. Patent No. 2,331,594, dated October 12, 1943, to Blair, or U. S. Patent No. 2,465,237, dated March 22, 1949, to Larsen.

When the products of the kind herein described are used for water flooding and particularly in the form of salts, they have unusual value in a fresh water or brine system for the inhibition of the growth of both anaerobic and aerobic bacteria but are particularly applicable in controlling the sulfate reducing organisms which cause difficulty in secondary recovery operations. Thus, one may use some other agent or agents in water flood systems and use compounds as herein described primarily for reducing bacterial growth. The use of such industrial bactericide is well known and the procedure is conventional; for instance, one can use the methods described in an article entitled "The Role of Microorganisms," by R. C. Allred, which appeared in Producers Monthly, volume 18, No. 4, pages 18–22.

Attention again is directed to the fact that the cogeneric mixtures herein described contain a significant or substantial amount of cyclic amidines or cyclic amidine derivatives. There is no intention of differentiating between the unneutralized product, the hydrate formed on combination with water, and the salts. As far as we have been able to determine in every instance the amount of cyclic amidine compounds or derivatives present represent approximately one-third or more, probably one-half or more, of the total cogeneric mass. In many instances probably two-thirds, or almost the entire cogeneric mass, is characterized by the cyclic amidine structure.

In the use of the herein described products as industrial bactericides and particularly in connection with water flood operations we prefer to use the salts obtained by partial or total neutralization with carboxy acids, particularly monocarboxy acids having not over 6 carbon atoms and preferably a hydroxylated acid such as hydroxyacetic acid.

Specific attention is directed to the article entitled "Preparation of Water for Injection Into Water Reservoirs," which appeared in the Journal of Petroleum Technology, volume 7, No. 4, page 9 (April 1955). The author is Torrey.

Having thus described our invention, what we claim as new and desire to secure by Letters Patent, is:

1. A process for the preparation of a solvent-soluble cogeneric mixture containing cyclic amidines and cyclic amidine derivatives which comprises reacting a polyalkylene amine capable of forming cyclic amidines with a blown fatty oil at a temperature above amidification temperature and below pyrolysis temperature of the mixture.

2. A process for the preparation of a solvent-soluble cogeneric mixture containing imidazolines and imidazoline derivatives which comprises reacting a polyethylene amine capable of forming cyclic amidines with a blown fatty oil at a temperature above amidification temperature and below pyrolysis temperature of the mixture.

3. The process of claim 2 in which the polyethylene amine has not over 6 nitrogen atoms.

4. The process of claim 2 in which the polyethylene amine has at least 3 and not over 5 nitrogen atoms.

5. The process of claim 4 wherein the blown fatty oil is blown soyabean oil.

6. The process of claim 4 wherein the blown fatty oil is blown castor oil.

7. The process of claim 4 wherein the blown fatty oil is blown linseed oil.

8. The process of claim 4 wherein the blown fatty oil is blown dehydrated castor oil.

9. The process of claim 4 wherein the blown fatty oil is blown cottonseed oil.

10. The cogeneric mixture obtained by the process defined in claim 1.

11. The cogeneric mixture obtained by the process defined in claim 2.

12. The cogeneric mixture obtained by the process defined in claim 3.

13. The cogeneric mixture obtained by the process defined in claim 4.

14. The cogeneric mixture obtained by the process defined in claim 5.

15. The cogeneric mixture obtained by the process defined in claim 6.

16. The cogeneric mixture obtained by the process defined in claim 7.

17. The cogeneric mixture obtained by the process defined in claim 8.

18. The cogeneric mixture obtained by the process defined in claim 9.

19. The product of claim 10 in which the cogeneric mixture is at least partially neutralized with a low molal monocarboxy acid having not over 6 carbon atoms.

20. The product of claim 11 in which the cogeneric mixture is at least partially neutralized with a low molal monocarboxy acid having not over 6 carbon atoms.

21. The product of claim 12 in which the cogeneric mixture is at least partially neutralized with a low molal monocarboxy acid having not over 6 carbon atoms.

22. The product of claim 13 in which the cogeneric mixture is at least partially neutralized with a low molal monocarboxy acid having not over 6 carbon atoms 23. The product of claim 14 in which the cogeneric mixture is at least partially neutralized with a low molal monocarboxy acid having not over 6 carbon atoms.

24. The product of claim 15 in which the cogeneric mixture is at least partially neutralized with a low molal monocarboxy acid having not over 6 carbon atoms.

25. The product of claim 16 in which the cogeneric mixture is at least partially neutralized with a low molal monocarboxy acid having not over 6 carbon atoms.

26. The product of claim 17 in which the cogeneric mixture is at least partially neutralized with a low molal monocarboxy acid having not over 6 carbon atoms.

27. The product of claim 18 in which the cogeneric mixture is at least partially neutralized with a low molal monocarboxy acid having not over 6 carbon atoms.

References Cited in the file of this patent

UNITED STATES PATENTS

| | | |
|---|---|---|
| Re. 23,227 | Blair et al. | May 9, 1950 |
| 2,155,877 | Waldmann et al. | Apr. 25, 1939 |
| 2,646,399 | Hughes | July 21, 1953 |